(12) United States Patent
Worrell

(10) Patent No.: US 7,348,508 B2
(45) Date of Patent: Mar. 25, 2008

(54) HORN SWITCH APPARATUS FOR A VEHICLE STEERING WHEEL

(75) Inventor: Barry C. Worrell, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 123 days.

(21) Appl. No.: 11/418,970

(22) Filed: May 5, 2006

(65) Prior Publication Data

US 2007/0256916 A1    Nov. 8, 2007

(51) Int. Cl.
*H01H 9/00* (2006.01)
(52) U.S. Cl. .................. 200/61.54; 200/61.55
(58) Field of Classification Search ... 200/61.54–61.57
See application file for complete search history.

(56) References Cited

U.S. PATENT DOCUMENTS

| | | | |
|---|---|---|---|
| 5,036,169 A * | 7/1991 | Sakane .................... 200/61.54 |
| 5,308,106 A * | 5/1994 | Heidorn .................. 280/728.3 |
| 5,333,897 A | 8/1994 | Landis et al. |
| 6,092,832 A | 7/2000 | Worrell et al. |
| 6,196,573 B1 | 3/2001 | Worrell et al. |
| 6,457,379 B1 * | 10/2002 | Mirone ........................ 74/552 |
| 6,941,836 B2 * | 9/2005 | Umemura et al. ............ 74/552 |
| 6,942,247 B2 * | 9/2005 | Simpson ..................... 280/731 |
| 7,232,966 B2 * | 6/2007 | Burgard et al. .......... 200/61.55 |

* cited by examiner

*Primary Examiner*—Elvin Enad
*Assistant Examiner*—Lheiren Mae A. Anglo
(74) *Attorney, Agent, or Firm*—Douglas D. Fekete

(57) ABSTRACT

A set of horn switch assemblies are mounted on a base plate of a vehicle steering wheel and linked by two continuous electrical conductors that are electrically bridged to activate a horn. Each switch assembly includes an insulator base affixed to the base plate and a deflectable metal blade disposed atop the insulator base substantially parallel to the base plate. The metal blade is anchored to the insulator base at one end and deflectable toward the base plate at the other end. One electrical conductor is secured to the insulator base below and in contact with the anchored end of the metal blade, while the other electrical conductor is secured to the insulator base below and out of contact with the deflectable end of the metal blade. A driver air bag assembly deflects the metal blades to electrically bridge the two electrical conductors for activating the horn.

7 Claims, 3 Drawing Sheets

HORN SWITCH APPARATUS FOR A VEHICLE STEERING WHEEL

TECHNICAL FIELD

The present invention relates to an electrical switch apparatus disposed in a vehicle steering wheel for driver-activation of an electrical or electro-mechanical horn.

BACKGROUND OF THE INVENTION

A steering wheel assembly of a modern vehicle includes a foam covered base plate with spokes and rim, a driver air bag (DAB) assembly, and a set of electrical contacts for activation of one or more horns. A set of spring-biased locking pawls secure the DAB assembly to the base plate while permitting limited deflection of the DAB assembly toward the base plate to activate the horn when the driver pushes on the exposed surface of the DAB assembly. Horn activation occurs when deflection of the DAB assembly relative to the base plate closes one or more normally-open switches disposed between or integrated into the DAB assembly and the base plate. What is desired is a reliable horn switch apparatus that is inexpensive to manufacture and that contributes to low overall cost of the steering wheel assembly. Furthermore, it is desired that the horn switches be electrically isolated from the DAB assembly to simplify the assembly of the steering wheel components.

SUMMARY OF THE INVENTION

The present invention is directed to an improved horn switch apparatus for a vehicle steering wheel including a set of switch assemblies mounted on a base plate of the steering wheel and linked by two continuous electrical conductors that can be electrically bridged to activate at least one electrical or electro-mechanical horn. Each switch assembly comprises an insulator base affixed to the base plate and a deflectable metal blade disposed atop the insulator base substantially parallel to the base plate. In each switch assembly, the metal blade is anchored to the insulator base at one end and deflectable toward the base plate at the other end. A first of the two electrical conductors is secured to each insulator base below and in contact with the anchored end of the respective metal blade, while the other electrical conductor is secured to each insulator base below and out of contact with the deflectable end of the metal blade. A driver air bag (DAB) assembly resiliently secured to the base plate has a set of posts that extend toward the base plate and terminate in close proximity to the deflectable end of each metal blade such that deflection of the DAB assembly toward the base plate produces like deflection of one or more of the metal blades to electrically bridge the two electrical conductors for activating the horn.

DESCRIPTION OF THE PREFERRED EMBODIMENT

Figure 1:
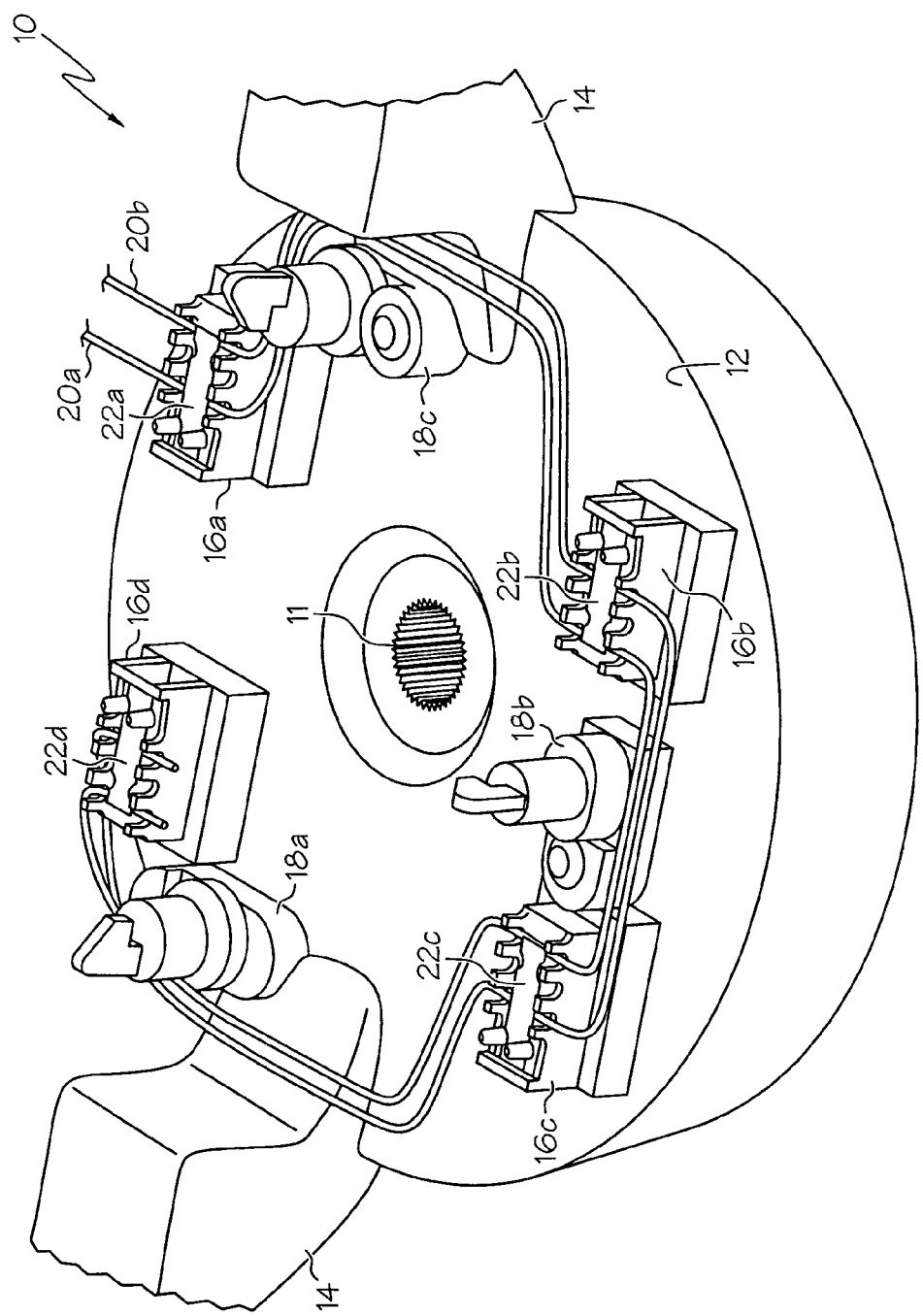
FIG. 1 is a diagram of a vehicle steering wheel assembly including a set of switch assemblies according to this invention.

Referring to the drawings, and particularly to FIG. 1, the reference numeral 10 generally designates a portion of a steering wheel assembly configured for conventional attachment to a vehicle steering column via splined central opening 11. The assembly 10 includes a foam-covered wheel with base plate 12 and spokes 14, a set of four electrically linked horn switch assemblies 16a, 16b, 16c, 16d, and a set of three spring-biased locking pawl fasteners 18a, 18b, 18c. The assembly 10 is completed by resiliently attaching a driver air bag (DAB) assembly (not shown) to the base plate 12, and the fasteners 18a-18c are bolted to base plate 12 for this purpose. The fasteners 18a-18c are illustrated in outline, and may be constructed substantially as shown in the U.S. Pat. No. 6,092,832, for example.

The switch assemblies 16a-16d are mechanically fastened to the base plate 12, and are electrically linked by first and second insulated wires 20a and 20b. The wires 20a-20b may originate, for example, in a remotely mounted relay center, and they sequentially pass through the switch assemblies 16a, 16b, 16c and 16d, terminating just inboard of the switch assembly 16d as shown. As explained below, the switch assemblies 16a-16d each include a deflectable metal blade 22a, 22b, 22c, 22d that overlies insulation-stripped portions of the wires 20a and 20b, and the fasteners 18a-18c permit the DAB assembly to be deflected toward the base plate 12 for deflecting one or more of the metal blades 22a-22d to electrically bridge the wires 20a and 20b for activating the vehicle horn.

Figure 2:
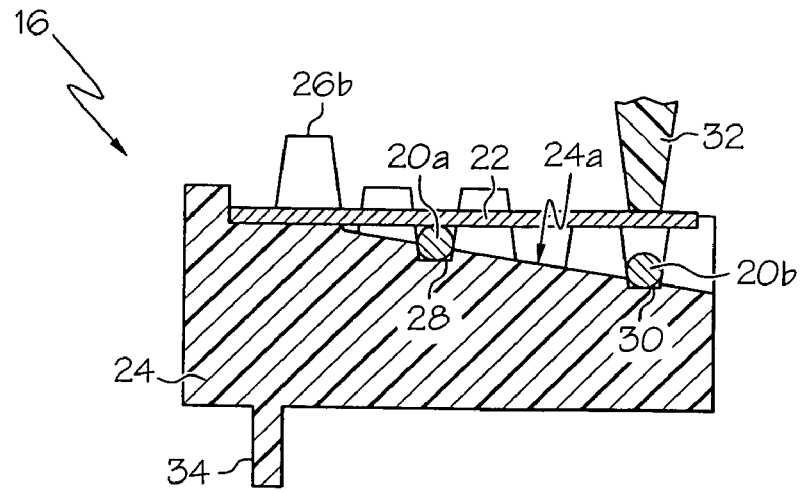
FIG. 2 is a longitudinal cross-sectional view of a representative switch assembly of FIG. 1 in an electrically open state, along with a post of a driver air bag (DAB) assembly that is displaceable toward the switch assembly to change its state.
Figure 3:
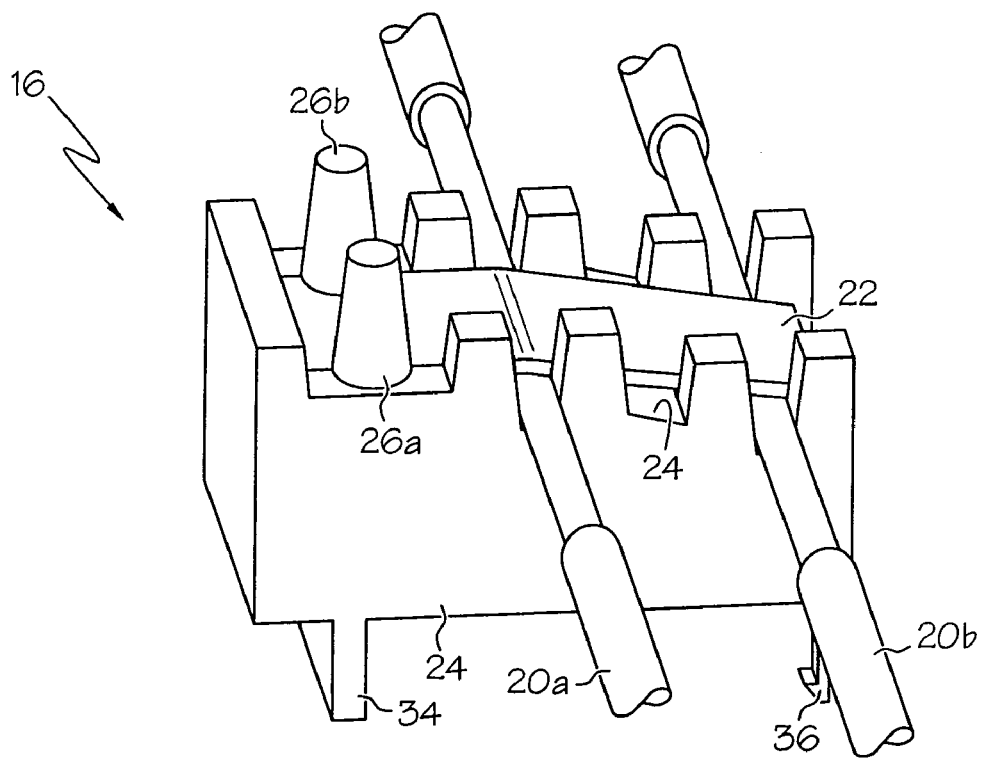
FIG. 3 is an isometric diagram of a representative switch assembly of FIG. 1 in an electrically closed condition.

As seen more clearly in FIGS. 2-3 in respect to the depicted representative horn switch assembly 16, each of the switch assemblies 16a-16d comprises a rectangular insulator base 24 including a pair of conical posts 26a, 26b at one end. Beyond the posts 26a-26b, the central upper surface 24a of base 24 slopes downward as best seen in the cross-sectional view of FIG. 2. Insulator-stripped portions of the wires 20a and 20b are received and retained (by heat staking, for example) in a pair of notches 28, 30 that extend laterally across the sloped surface 24a of base 24. The notch 28 is located close to the posts 26a-26b, and retains the wire 20a; the notch 30 is located near the other end of the sloped surface 24a, and retains the wire 20b. The lateral periphery of the base 24 may be toothed as shown to facilitate placement and retention of the wires 20a and 20b in notches 28 and 30.

The metal blade 22 is placed on the sloped surface 24a atop the insulation stripped wires 20a-20b. The lateral periphery of metal blade 22 is contoured so that it lays flat on the surface 24a between the posts 26a and 26b, and the posts 26a-26b are heat-staked to anchor the metal blade 22 to the base 24 at that point. The metal blade 22 is thus supported in the manner of a diving board, with one end free to be deflected downward when acted on by a downwardly extending post 32 of the overlying DAB assembly. When the free end of metal blade 22 is deflected downward in this manner, it electrically bridges the underlying wires 20a and 20b, as best seen in FIG. 3. The metal blade 22 and wires 20a-20b are preferably tin-plated to ensure that reliable electrical connections are consistently achieved.

The switch assemblies 16a-16d are conveniently located on base plate 12 and fastened thereto via the tab and prong features 34 and 36, as best seen in FIG. 3. The tab 34 and a pair of laterally opposed prongs 36 (only one of which is shown in FIG. 3) fit into corresponding openings in base plate 12, and barbs formed on then end of the prongs 36 hook into the form or metal material of base plate 12 to mechanically fasten the switch assemblies 16a-16d to base plate 12.

Figure 4:
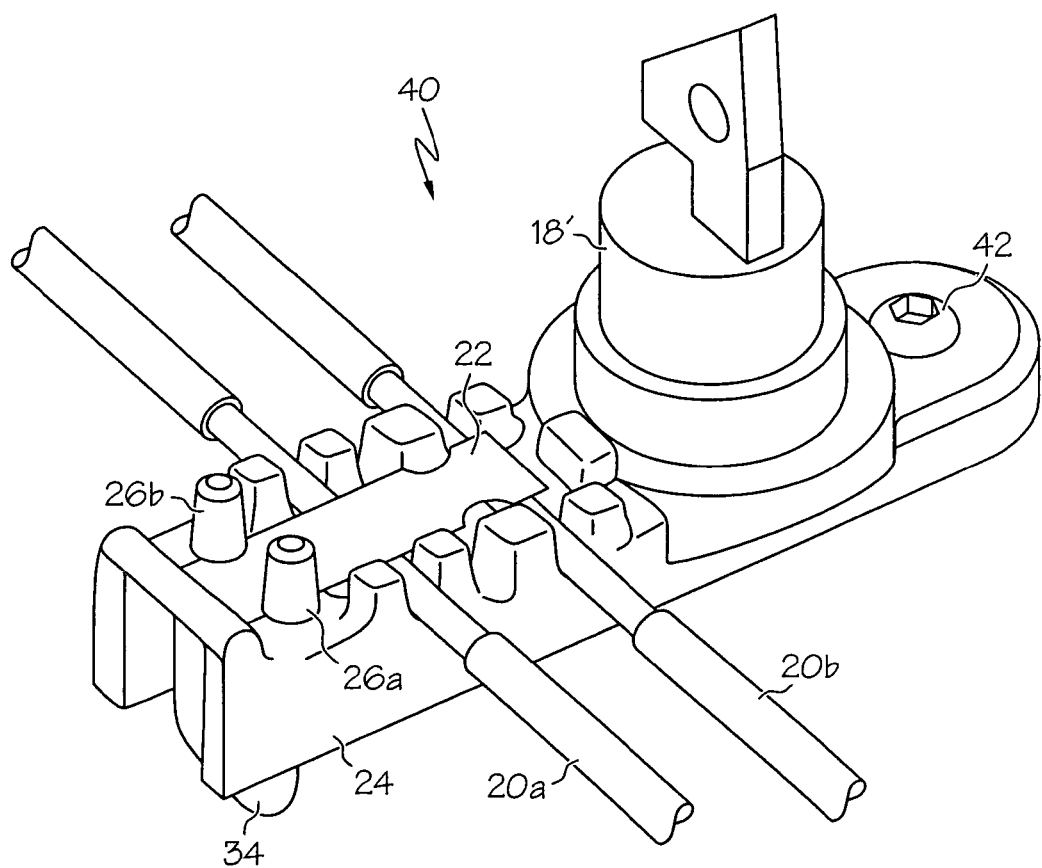
FIG. 4 is an isometric view of a switch assembly according to this invention combined with a mounting apparatus for securing a DAB assembly to the steering wheel assembly.

FIG. 4 depicts an alternate embodiment in which a horn switching assembly and a spring-biased locking pawl fastener 18' are joined to form a single assembly generally designated by the reference numeral 40. The joined components function as described above, but assembly is simplified because fewer components are required. Moreover, a single bolt 42 is used to affix the assembly 40 to the base plate 12. The locating tab 34 may be used as described above in respect to FIG. 3 to properly locate the assembly 40 on base plate 12.

In summary, the present invention provides a reliable horn switch apparatus that is inexpensive to manufacture and that contributes to low overall cost of the steering wheel assembly. The insulator bodies 24 may be formed by injection molding, and joined with a pair of selectively stripped insulated wires 20a-20b and metal blades 22 before being separated from the injection manifold. The horn switch apparatus so assembled is easily and quickly installed on the steering wheel base plate 12, particularly in applications where the horn switch and locking pawl fastener are combined as depicted in FIG. 4. Additionally, the horn switch apparatus is electrically isolated from the DAB assembly, further simplifying the steering wheel assembly process.

While the present invention has been described with respect to the illustrated embodiments, it is recognized that numerous modifications and variations in addition to those mentioned herein will occur to those skilled in the art. For example, the number of horn switch assemblies in a given steering wheel assembly may be different than shown herein, the horn switch assemblies may be affixed to the base plate 12 with conventional fasteners, and so on. Accordingly, it is intended that the invention not be limited to the disclosed embodiments, but that it have the full scope permitted by the language of the following claims.

The invention claimed is:

1. Switch apparatus mounted on a vehicle steering wheel for activating a horn, comprising:

an insulator base affixed to a base plate of the steering wheel;

first and second spaced electrical conductors laterally spanning an upper surface of said insulator base;

a deflectable metal blade having a first end that is anchored to said insulator base in contact with said first electrical conductor, and a second end that is suspended over said second electrical conductor; and horn activation means for deflecting the second end of said metal blade toward said base plate and into contact with said second electrical conductor to electrically bridge said first and second electrical conductors for activating said horn.

2. The switch apparatus of claim 1, wherein:

the upper surface of said insulator base includes a sloped portion that slopes downward toward said base plate; and said first and second spaced electrical conductors laterally span the sloped portion of said insulator base.

3. The switch apparatus of claim 2, wherein:

said first and second electrical conductors are respectively retained in upper and lower notches laterally spanning the sloped portion of said insulator base.

4. The switch apparatus of claim 1, wherein:

a plurality of said insulator bases, each equipped with a deflectable metal blade, are affixed to the base plate of said steering wheel;

said first and second spaced electrical conductors laterally span an upper surface of each such insulator base; and said horn activation means includes means for deflecting a second end of any of the deflectable metal blades for activating said horn.

5. The switch apparatus of claim 1, wherein:

said insulator base is combined with a locking fastener for affixing said horn activation means to said steering wheel.

6. The switch apparatus of claim 1, wherein:

said insulator base includes projections that are inserted into said base plate to locate said insulator base on said base plate.

7. The switch apparatus of claim 6, wherein:

at least one of said projections is barbed for affixing said insulator base to said base plate when inserted into said base plate.

* * * * *